(12) United States Patent
Fattal et al.

(10) Patent No.: US 12,140,791 B2
(45) Date of Patent: Nov. 12, 2024

(54) MULTI-ZONE BACKLIGHT, MULTIVIEW DISPLAY, AND METHOD

(71) Applicant: LEIA INC., Menlo Park, CA (US)

(72) Inventors: David A. Fattal, Menlo Park, CA (US); Thomas Hoekman, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 254 days.

(21) Appl. No.: 17/505,565

(22) Filed: Oct. 19, 2021

(65) Prior Publication Data

US 2022/0035088 A1 Feb. 3, 2022

Related U.S. Application Data

(63) Continuation of application No. PCT/US2020/029014, filed on Apr. 20, 2020.
(Continued)

(51) Int. Cl.
*F21V 8/00* (2006.01)

(52) U.S. Cl.
CPC .......... *G02B 6/0036* (2013.01); *G02B 6/0078* (2013.01)

(58) Field of Classification Search
CPC ........................... G02B 6/0036; G02B 6/0078
See application file for complete search history.

(56) References Cited

U.S. PATENT DOCUMENTS 9,128,226 B2   9/2015   Fattal et al.
9,201,270 B2   12/2015  Fattal et al.
(Continued)

FOREIGN PATENT DOCUMENTS

CA   3134524 A1   10/2020
CA   3134524 C    6/2023
(Continued)

OTHER PUBLICATIONS

International Search Report and Written Opinion (ISRWO) by International Searching Authority (ISA) Korean Intellectual Property Office (KIPO) dated Aug. 12, 2020 (8 pages) for foreign counterpart parent International Application No. PCT/US2020/029014.
(Continued)

*Primary Examiner* — Thai Q Tran
*Assistant Examiner* — Jose M Mesa
(74) *Attorney, Agent, or Firm* — Schwegman Lundberg & Woessner, P.A.

(57) ABSTRACT

A multi-zone backlight and multi-zone multiview display with multiple zones selectively provide broad-angle emitted light corresponding to a two-dimensional (2D) image and directional emitted light corresponding to a multiview image to each zone of the multiple zones. The multi-zone backlight includes broad-angle backlight to provide the broad-angle emitted light and a multiview backlight to provide the directional emitted light. Each of the broad-angle backlight and the multiview backlight is divided into a first zone and a second zone that may be independently activated to provide the broad-angle emitted light and multiview emitted light, respectively. The multi-zone multiview display includes the broad-angle backlight and the multiview backlight and further includes an array of light valves configured to modulate the broad-angle emitted light as a two-dimensional image and the directional emitted light as a multiview image on a zone-by-zone basis.

21 Claims, 9 Drawing Sheets

Related U.S. Application Data

(60) Provisional application No. 62/837,167, filed on Apr. 22, 2019.

(56) References Cited

U.S. PATENT DOCUMENTS

| | | | |
|---|---|---|---|
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 10,345,505 B2 | 7/2019 | Fattal | |
| 10,551,546 B2 | 2/2020 | Fattal | |
| 10,649,128 B2 | 5/2020 | Fattal et al. | |
| 10,705,281 B2 | 7/2020 | Fattal et al. | |
| 10,798,371 B2 | 10/2020 | Fattal | |
| 10,802,212 B2 | 10/2020 | Fattal | |
| 10,802,443 B2 | 10/2020 | Fattal | |
| 10,810,917 B2 | 10/2020 | Fattal | |
| 10,830,939 B2 | 11/2020 | Fattal et al. | |
| 10,838,134 B2 | 11/2020 | Fattal et al. | |
| 10,884,175 B2 | 1/2021 | Fattal | |
| 10,928,564 B2 | 2/2021 | Fattal | |
| 10,928,677 B2 | 2/2021 | Aieta et al. | |
| 10,969,627 B2 | 4/2021 | Fattal et al. | |
| 11,004,407 B2 | 5/2021 | Fattal et al. | |
| 11,016,235 B2 | 5/2021 | Fattal et al. | |
| 11,041,988 B2 | 6/2021 | Fattal et al. | |
| 11,048,036 B2 | 6/2021 | Ma et al. | |
| 11,143,811 B2 | 10/2021 | Fattal et al. | |
| 2007/0122971 A1 | 5/2007 | Dobuzinsky et al. | |
| 2009/0322986 A1 | 12/2009 | Wei et al. | |
| 2010/0220260 A1 | 9/2010 | Sugita et al. | |
| 2010/0245406 A1 | 9/2010 | Redert et al. | |
| 2012/0032997 A1 | 2/2012 | Cha et al. | |
| 2012/0200807 A1 | 8/2012 | Wei et al. | |
| 2012/0249537 A1* | 10/2012 | Bae | H04N 13/31 345/419 |
| 2013/0076999 A1 | 3/2013 | Minami et al. | |
| 2013/0083904 A1 | 4/2013 | Anderson | |
| 2013/0169518 A1 | 7/2013 | Wu et al. | |
| 2015/0156480 A1* | 6/2015 | Hamagishi | H04N 13/31 348/51 |
| 2015/0177497 A1* | 6/2015 | Travis | G02B 27/0172 359/291 |
| 2016/0202594 A1* | 7/2016 | Kim | G02B 30/24 348/55 |
| 2017/0085867 A1* | 3/2017 | Baran | B41M 3/008 |
| 2017/0299793 A1* | 10/2017 | Fattal | G02B 6/0036 |
| 2017/0363794 A1* | 12/2017 | Wan | G02B 30/33 |
| 2019/0018186 A1 | 1/2019 | Fattal | |
| 2020/0018891 A1 | 1/2020 | Fattal et al. | |
| 2020/0033526 A1 | 1/2020 | Fattal et al. | |
| 2020/0033619 A1 | 1/2020 | Fattal et al. | |
| 2020/0033621 A1 | 1/2020 | Fattal et al. | |
| 2020/0228782 A1 | 7/2020 | Fattal | |
| 2020/0301165 A1 | 9/2020 | Fattal | |
| 2020/0310135 A1 | 10/2020 | Fattal | |
| 2021/0116757 A1 | 4/2021 | Fattal | |
| 2021/0157050 A1 | 5/2021 | Fattal | |
| 2021/0209980 A1 | 7/2021 | Fattal | |

FOREIGN PATENT DOCUMENTS

| | | | |
|---|---|---|---|
| CN | 101211066 A | 7/2008 | |
| CN | 107950024 A | 4/2018 | |
| CN | 108603986 A | 9/2018 | |
| CN | 113711112 A | 11/2021 | |
| CN | 113711112 B | 10/2023 | |
| EP | 3959561 A1 | 3/2022 | |
| EP | 3959561 A4 | 1/2023 | |
| GB | 2405543 A | 3/2005 | |
| JP | 2005078091 A | 3/2005 | |
| JP | 2007122971 A | 5/2007 | |
| KR | 20150078671 A | 7/2015 | |
| KR | 20210133322 A | 11/2021 | |
| WO | 2012038856 A1 | 3/2012 | |
| WO | WO-2016160048 A1 | 10/2016 | |
| WO | WO-2017213676 A1 * | 12/2017 | G02B 27/2271 |
| WO | 2018187019 A1 | 10/2018 | |
| WO | 2019070317 A1 | 4/2019 | |
| WO | 2020131106 A1 | 6/2020 | |
| WO | 2020139338 A1 | 7/2020 | |
| WO | 2020154318 A1 | 7/2020 | |
| WO | 2020167374 A1 | 8/2020 | |
| WO | 2020185264 A1 | 9/2020 | |
| WO | 2020190341 A1 | 9/2020 | |
| WO | WO-2020219399 A1 | 10/2020 | |
| WO | 2021076114 A1 | 4/2021 | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

"Chinese Application Serial No. 202080030887.2, Notice of Allowance mailed Jul. 7, 2023", w/ English Translation, 3 pgs.

"Chinese Application Serial No. 202080030887.2, Office Action mailed Feb. 7, 2023", w/ English Translation, 16 pgs.

"European Application Serial No. 20795836.4, Extended European Search Report mailed Jan. 2, 2023", 9 pgs.

"European Application Serial No. 20795836.4, Response filed Jul. 5, 2023 to Extended European Search Report mailed Jan. 2, 2023", 15 pgs.

"European Application Serial No. 20795836.4, Response to Communication pursuant to Rules 161(1) and 162 EPC filed May 10, 2022", 21 pgs.

"International Application Serial No. PCT/US2020/029014, International Preliminary Report on Patentability mailed Nov. 4, 2021", 5 pgs.

"Korean Application Serial No. 10-2021-7034934, Final Office Action mailed Mar. 15, 2024", w/ English translation, 8 pgs.

"Korean Application Serial No. 10-2021-7034934, Office Action mailed Jun. 30, 2023", w/ English Translation, 19 pgs.

"Korean Application Serial No. 10-2021-7034934, Response filed Oct. 10, 2023 to Office Action mailed Jun. 30, 2023", w/ English Translation, 21 pgs.

* cited by examiner

MULTI-ZONE BACKLIGHT, MULTIVIEW DISPLAY, AND METHOD

CROSS-REFERENCE TO RELATED APPLICATIONS

This application is a continuation application of and claims priority to International Patent Application No. PCT/US2020/029014, filed Apr. 20, 2020, which claims the benefit of priority to U.S. Provisional Patent Application Ser. No. 62/837,167, filed Apr. 22, 2019, the entire contents of both of which are herein incorporated by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light-emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
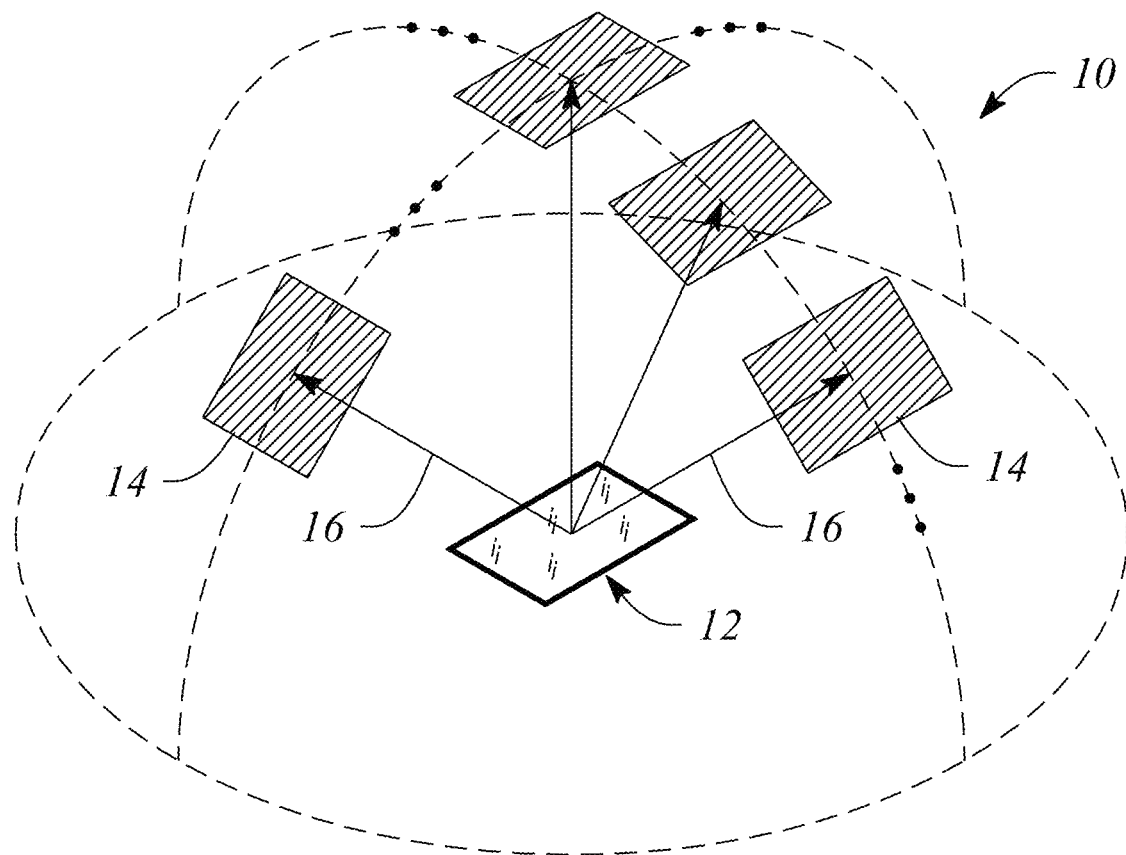
FIG. 1A illustrates a perspective view of a multiview display in an example, according to an embodiment consistent with the principles described herein.

Certain examples and embodiments may have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide multi-zone backlighting with application to a multi-zone multiview display as well as methods of operation thereof. In particular, in accordance with the principles described herein, a multi-zone backlight is configured to provide broad-angle emitted light and directional emitted light comprising directional light beams to zones of the multi-zone backlight. Further, either the broad-angle emitted light or directional emitted light may be selectively provided on a zone-by-zone basis to the zones. The broad-angle emitted light may support the display of 2D information (e.g., a 2D image or text), while the directional light beams of the directional emitted light may support the display of multiview or three-dimensional (3D) information (e.g., a multiview image), for example. For example, a multi-zone multiview display may that employs the multi-zone backlight may be configured to selectively provide either a 2D image or a multiview image to different zones of a plurality of zones of the multi-zone multiview display.

According to various embodiments, the multiview image provided by the multi-zone multiview display may be a so-called 'glasses-free' or autostereoscopic image, while the 2D image may facilitate presenting of 2D information or content at a relatively higher native resolution than is available to provide the multiview image. Uses of multi-zone backlighting in multi-zone multiview displays described herein include, but are not limited to, mobile telephones (e.g., smart phones), watches, tablet computes, mobile computers (e.g., laptop computers), personal computers and computer monitors, automobile display consoles, camera displays, and various other mobile as well as substantially non-mobile display applications and devices.

Herein a 'two-dimensional (2D) display' is defined as a display configured to provide a view of an image that is substantially the same regardless of a direction from which the image is viewed (i.e., within a predefined viewing angle or range of the 2D display). A liquid crystal display (LCD) found in many smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. In some instances, a multiview display may also be referred to as a three-dimensional (3D) display, e.g., when simultaneously viewing two different views of the multiview image provides a perception of viewing a three-dimensional image.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
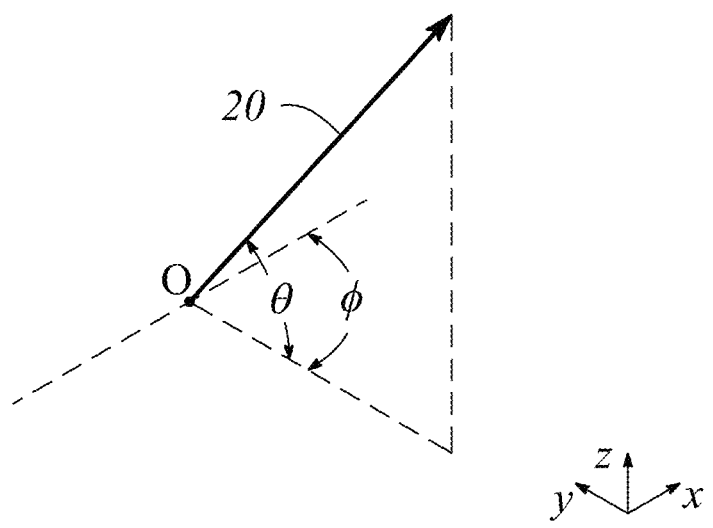
FIG. 1B illustrates a graphical representation of the angular components of a light beam having a particular principal angular direction in an example, according to an embodiment consistent with the principles described herein.

FIG. 1B illustrates a graphical representation of the angular components $\{\theta, \phi\}$ of a light beam 20 having a particular principal angular direction or simply 'direction' corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin, O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays may include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels or 'view' pixels in each of a similar plurality of different views of a multiview display. In particular, a multiview pixel may have individual view pixels corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels located at $\{x_1 y_1\}$ in each of the different views of a multiview image, while a second multiview pixel may have individual view pixels located at $\{x_2 y_2\}$ in each of the different views, and so on. In some embodiments, a number of view pixels in a multiview pixel may be equal to a number of views of the multiview display.

Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piecewise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

As defined herein, a 'non-zero propagation angle' of guided light is an angle relative to a guiding surface of a light guide. Further, the non-zero propagation angle is both greater than zero and less than a critical angle of total internal reflection within the light guide, by definition herein. Moreover, a specific non-zero propagation angle may be chosen (e.g., arbitrarily) for a particular implementation as long as the specific non-zero propagation angle is less than the critical angle of total internal reflection within the light guide. In various embodiments, the light may be introduced or coupled into the light guide 124 at the non-zero propagation angle of the guided light.

According to various embodiments, guided light or equivalently a guided 'light beam' produced by coupling light into the light guide may be a collimated light beam. Herein, a 'collimated light' or 'collimated light beam' is generally defined as a beam of light in which rays of the light beam are substantially parallel to one another within the light beam. Further, rays of light that diverge or are scattered from the collimated light beam are not considered to be part of the collimated light beam, by definition herein.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive scattering' in that the diffraction grating may scatter light out of the light guide by diffraction. Further, by definition herein, the features of a diffraction grating are referred to as 'diffractive features' and may be one or more of at, in, and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin \theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
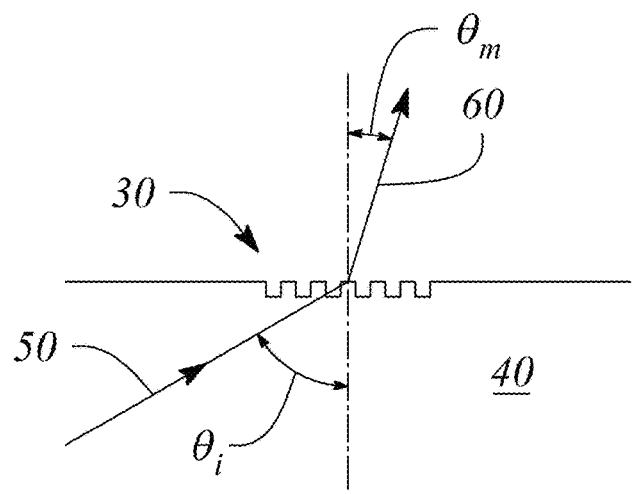
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The incident light beam 50 may be a beam of guided light (i.e., a guided light beam) within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example diffraction order m=1 (i.e., a first diffraction order).

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling or scattering out a portion of light guided in the light guide. Further, the light beams of the plurality of light beams produced by a multibeam element have different principal angular directions from one another, by definition herein. In particular, by definition, a light beam of the plurality has a predetermined principal angular direction that is different from another light beam of the light beam plurality. As such, the light beam is referred to as a 'directional light beam' and the light beam plurality may be termed a 'directional light beam plurality,' by definition herein.

Furthermore, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various directional light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a directional light beam produced by the multibeam element has a principal angular direction given by angular components $\{\theta, \phi\}$, by definition herein, and described above with respect to FIG. 1B.

Herein a 'collimator' is defined as substantially any optical device or apparatus that is configured to collimate light. For example, a collimator may include, but is not limited to, a collimating mirror or reflector, a collimating lens, a diffraction grating, a tapered light guide, and various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape or similar collimating characteristic in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example. A 'polarized' light source is defined herein as substantially any light source that produces or provides light having a predetermined polarization. For example, the polarized light source may comprise a polarizer at an output of an optical emitter of the light source.

Herein, a 'multiview image' is defined as a plurality of images (i.e., greater than three images) wherein each image of the plurality represents a different view corresponding to a different view direction of the multiview image. As such, the multiview image is a collection of images (e.g., two-dimensional images) which, when display on a multiview display, may facilitate a perception of depth and thus appear to be an image of a 3D scene to a viewer, for example.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., $>\pm20°$). In other embodiments, the broad-angle emitted light cone angle may be greater than about thirty degrees (e.g., $>\pm30°$), or greater than about forty degrees (e.g., $>\pm40°$), or greater than about fifty degrees (e.g., $>\pm50°$). For example, the cone angle of the broad-angle emitted light may be greater than about sixty degrees (e.g., $>\pm60°$).

In some embodiments, the broad-angle emitted light cone angle may defined to be about the same as a viewing angle of an LCD computer monitor, an LCD tablet, an LCD television, or a similar digital display device meant for broad-angle viewing (e.g., about $\pm40$-$65°$). In other embodiments, broad-angle emitted light may also be characterized or described as diffuse light, substantially diffuse light, non-directional light (i.e., lacking any specific or defined directionality), or as light having a single or substantially uniform direction.

Further, as used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
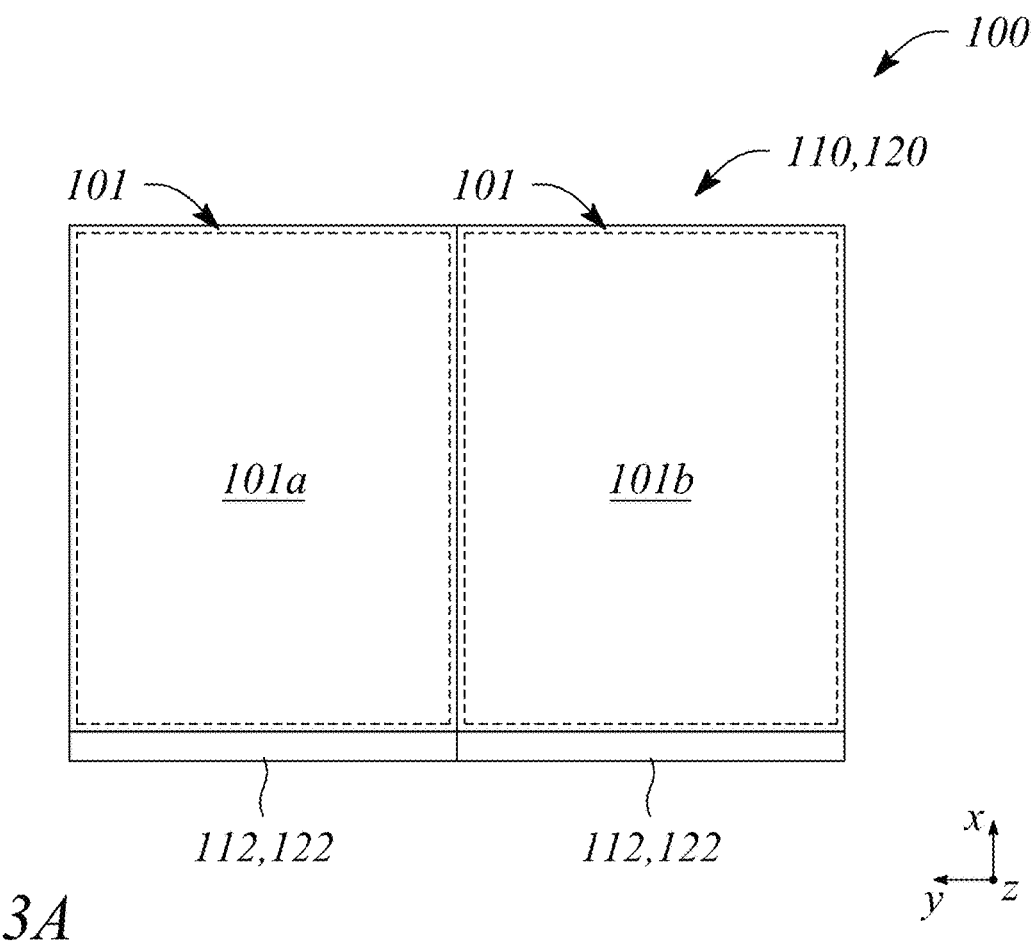
FIG. 3A illustrates a plan view of a multi-zone backlight in an example, according to an embodiment consistent with the principles described herein.
Figure 3B:
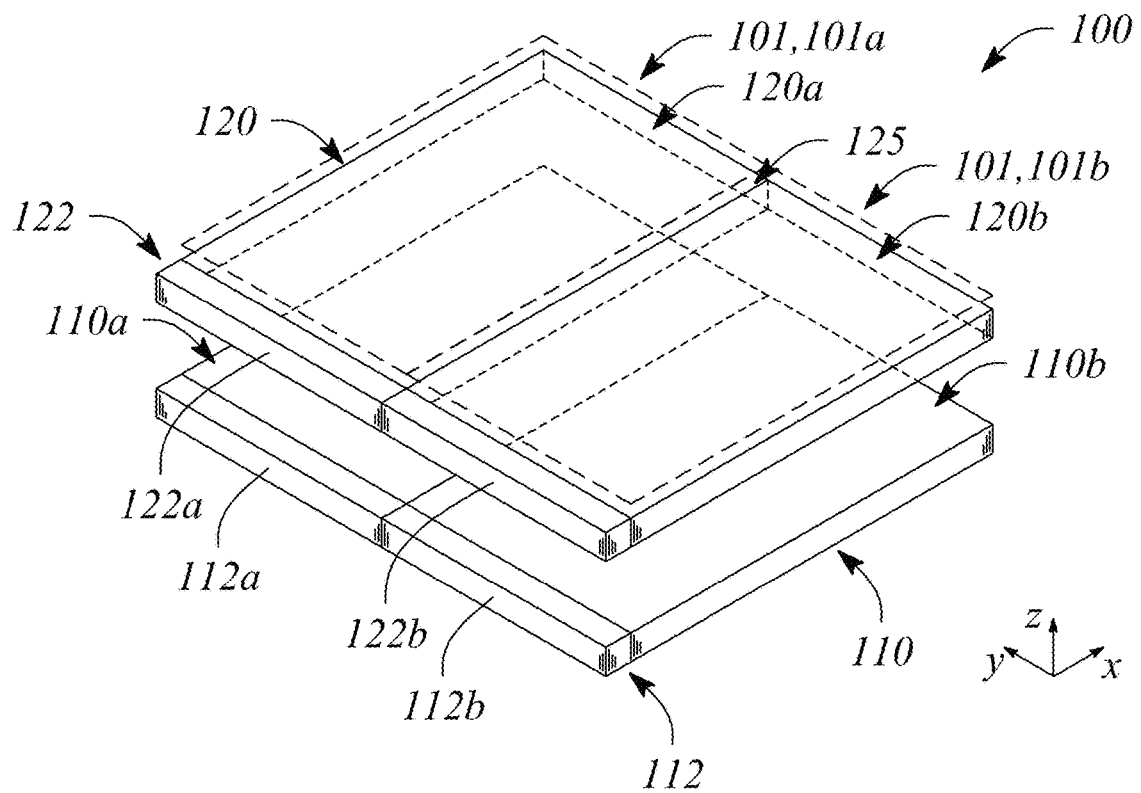
FIG. 3B illustrates a perspective view of a multi-zone backlight in an example, according to an embodiment consistent with the principles described herein.

In accordance with some embodiments of the principles described herein, a multi-zone backlight is provided. FIG. 3A illustrates a plan view of a multi-zone backlight 100 in an example, according to an embodiment consistent with the principles described herein. FIG. 3B illustrates a perspective view of a multi-zone backlight 100 in an example, according to an embodiment consistent with the principles described herein. In particular, the perspective view illustrated in FIG. 3B is an exploded perspective view.

As illustrated, the multi-zone backlight 100 has a plurality of different regions or zones 101, depicted in FIGS. 3A-3B as a first zone 101*a* and a second zone 101*b*, by way of example and not limitation. The multi-zone backlight 100 is configured to provide or emit light as emitted light in each of the zones 101. Further, the emitted light provided by the multi-zone backlight 100 is selectable on a zone-by-zone basis to be or comprise either broad-angle emitted or directional emitted light. In various embodiments, the directional emitted light comprises a plurality of directional light beams having principal angular directions that differ from one another. Further, directional light beams of the directional emitted light have directions corresponding to different view directions of a multiview image, according to various embodiments. Conversely, the broad-angle emitted light is largely non-directional and further generally has a cone angle that is greater than a cone angle of a view of the multiview image or multiview display associated with the multi-zone backlight 100.

According to various embodiments, the emitted light provided by the multi-zone backlight 100 may be used to illuminate an electronic display that employs the multi-zone backlight 100. For example, the emitted light may be used to illuminate an array of light valves (e.g., light valves, described below) of the electronic display. Further, the electronic display that employs or is illuminate by the multi-zone backlight 100 may be configured to selectively display either a two-dimensional (2D) image or a multiview image using the emitted light in each of a plurality of the different zone of the electronic display corresponding to the plurality of zones 101, as is described further below. Selection of an image type (i.e., a 2D image or a multiview image) in a particular zone may be determined by which of either the broad-angle emitted light or directional emitted light is emitted in that zone.

As illustrated, the multi-zone backlight 100 comprises a broad-angle backlight 110. The broad-angle backlight has or comprises a first zone 110*a* and a second zone 110*b*. According to various embodiments, each of the first and second zones 110*a*, 110*b* is configured to independently provide broad-angle emitted light when activated. For example, when the first zone 110*a* of the broad-angle backlight 110 is activated or turned on, broad-angle emitted light is emitted from or within the first zone 110*a*. Similarly, broad-angle emitted light is emitted from or within the second zone 110*b* when the second zone 110*b* of the broad-angle backlight 110 is activated or turned on. When not activated, broad angle emitted light is not emitted by respective first and second zones 110*a*, 110*b* of the broad-angle backlight 110. Note that the broad-angle backlight 110 may generally comprise a plurality of zones with the illustrated first and second zones 110*a*, 110*b* merely being representative of the zone plurality.

The multi-zone backlight 100 illustrated in FIGS. 3A-3B further comprises a multiview backlight 120. As illustrated, the multiview backlight 120 is divided into a first zone 120*a* and a second zone 120*b*, as illustrated. Each of the first and second zones 120*a*, 120*b* is configured to independently provide directional emitted light when activated. For example, when the first zone 120*a* of the multiview backlight 120 is activated or turned on, directional emitted light is emitted from or within the first zone 120*a*. Similarly, directional emitted light is emitted from or within the second zone 120*b* when the second zone 120*b* of the multiview backlight 120 is activated or turned on. When not activated, directional emitted light is not emitted by respective first and second zones 120*a*, 120*b* of the multiview backlight 120.

Further, the directional emitted light comprises directional light beams having directions corresponding to different view directions of a multiview image, according to various embodiments. Note that, as with the broad-angle backlight 110, the multiview backlight 120 may generally comprise a plurality of zones with the illustrated first and second zones 120*a*, 120*b* merely being representative of the zone plurality.

According to various embodiments, the multiview backlight 120 is transparent or at least substantially transparent to the broad-angle emitted light emitted by the broad-angle backlight 110. In particular, the multiview backlight 120 may be disposed adjacent to the broad-angle backlight 110 and the broad-angle emitted light may pass through the multiview backlight 120 when the zones of the broad-angle backlight 110 are activated. Further, the first and second zones 120*a*, 120*b* of the multiview backlight 120 may correspond to and be aligned with respective ones of the first and second zones 110*a*, 110*b* of the broad-angle backlight 110, according to various embodiments (e.g., as illustrated in FIGS. 3A-3B).

In some embodiments, the first zones 110*a*, 120*a* of each of the broad-angle backlight 110 and the multiview backlight 120 may be configured to be cooperatively activated to provide either the broad-angle emitted light or the directional emitted light in the first zone 101*a* of the multi-zone backlight 100. Further, the second zones 110*b*, 120*b* of the broad-angle backlight 110 and the multiview backlight 120 may be configured to be activated to cooperatively provide either broad-angle emitted light or directional emitted light in the second zone 101*b* of the multi-zone backlight 100, in some embodiments. For example, the first zone 110*a* of the broad-angle backlight 110 may be activated or turned on to provide the broad-angle emitted light, while first zone 120*a* of the multiview backlight 120 may be inactivated or turned off. As such, the multi-zone backlight 100 may exclusively provide broad-angle emitted light from the first zone 101*a*, in this example. Alternatively, the first zone 120*a* of the multiview backlight 120 may be activated or turned on to provide the directional emitted light, while first zone 110*a* of the broad-angle backlight 110 may be inactivated or turned off. In this example, the multi-zone backlight 100 may exclusively provide directional emitted light from the first zone 101*a*. Any combination of activation various ones of the first and second zones 110*a*, 110*b*, of the broad-angle backlight 110 and the first and second zones 120*a*, 120*b* of the multiview backlight 120 illustrated in FIGS. 3A-3B may be used to selectively provide any combination of broad-angle emitted light and directional emitted light in the corresponding first and second zones 101*a*, 101*b*, of the multi-zone backlight 100, according to various embodiments.

In some embodiments (not illustrated), one or both of the broad-angle backlight 110 and the multiview backlight 120 may include additional zones beyond the first and second zones 110*a*, 110*b*, 120*a*, 120*b*. In particular, the broad-angle backlight 110 may comprise more zones than the multiview backlight 120, in some embodiments. The additional zones of the broad-angle backlight 110 may be used to provide broad-angle emitted light concurrently with directional emitted light within a zone of the multiview backlight 120, in some embodiments.

As illustrated in FIGS. 3A and 3B, the broad-angle backlight 110 comprises a light source 112 and the multiview backlight 120 may comprise a light source 122. In particular, the first and second zones 110*a*, 110*b* of the broad-angle backlight 110 may comprise separate light sources 112*a*, 112*b*, while the first and second zones 120*a*, 120*b* of the multiview backlight 120 may comprise separate light source 122*a*, 122*b*. These separate light sources 112*a*, 112*b*, 122*a*, 122*b* are configured to provide light to or illuminate respective ones of the first and second zones 110*a*, 110*b*, 120*a*, 120*b*. In these embodiments, individual activation of the separate light sources 112*a*, 112*b*, 122*a*, 122*b* may be configured to activate respective ones of the first and second zones 110*a*, 110*b*, 120*a*, 120*b*. For example, activation or turning on a light source 122*a* of the first zone 120*a* of the multiview backlight 120 may activate the first zone 120*a*. In another example, the second zone 110*b* of the broad-angle backlight 110 may be activated by activating or turning on the separate light source 112*b* of the second zone 110*b* of the broad-angle backlight 110.

Figure 4A:
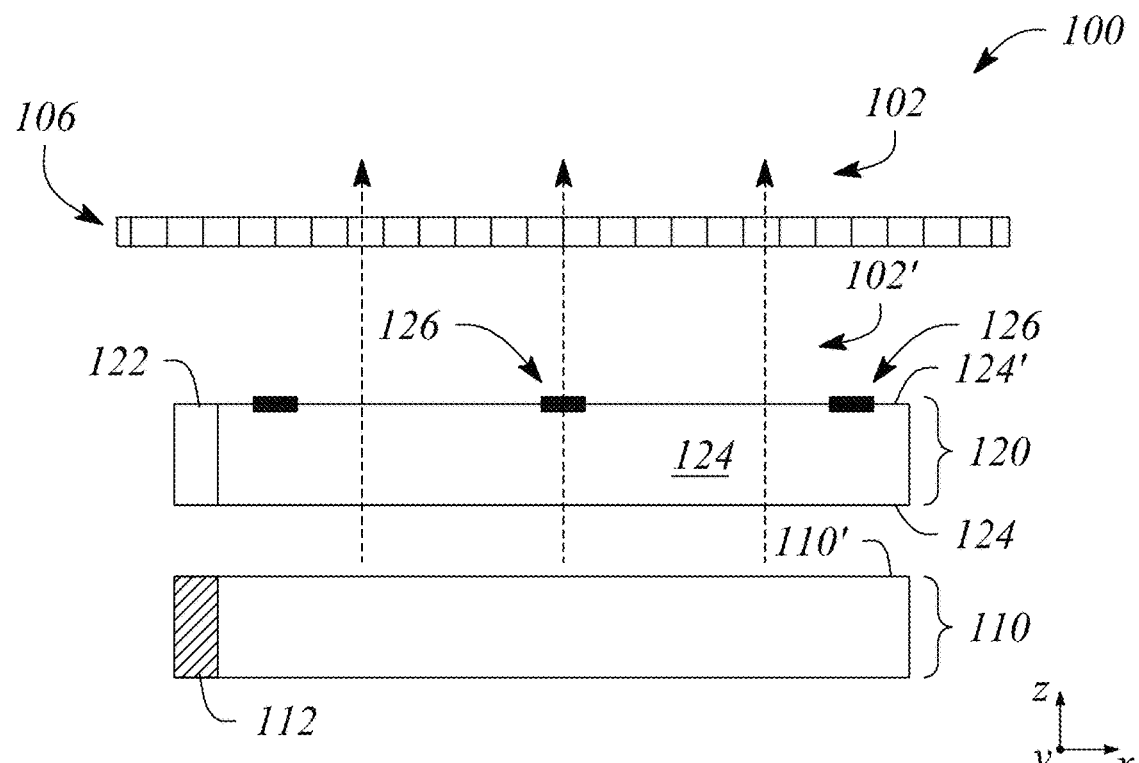
FIG. 4A illustrates a cross-sectional view of a multi-zone backlight in an example, according to an embodiment consistent with the principles described herein.
Figure 4B:
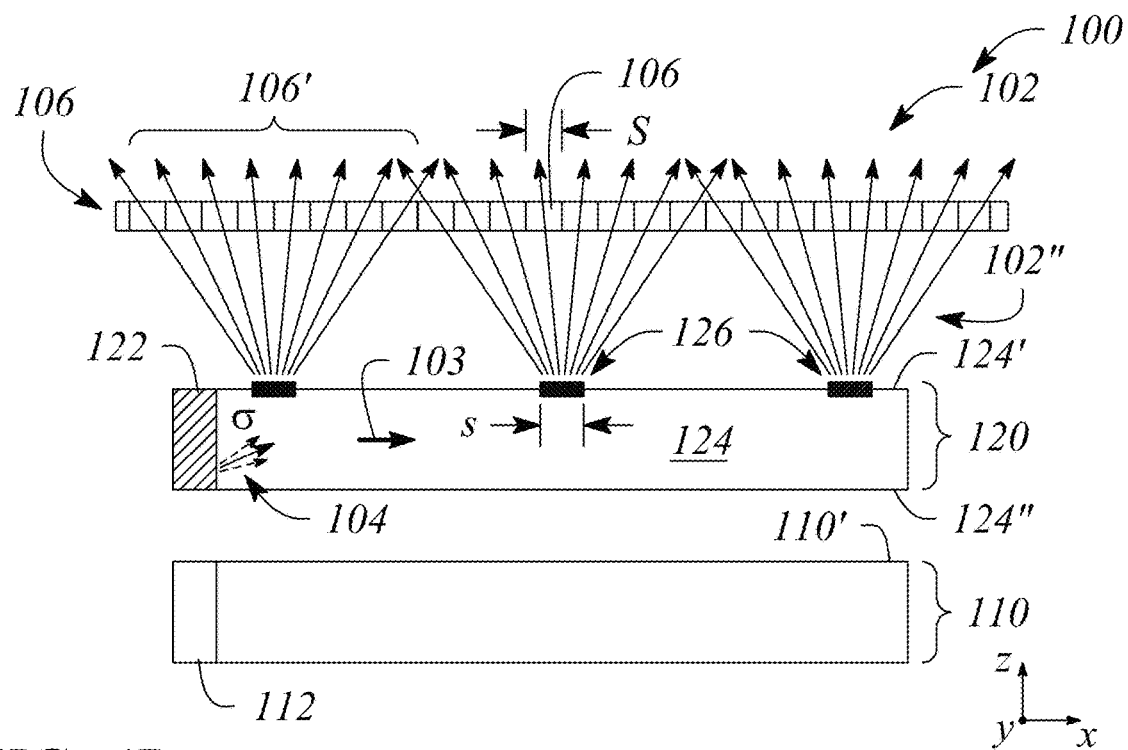
FIG. 4B illustrates a cross-sectional view of a multi-zone backlight in an example, according to an embodiment consistent with the principles described herein.
Figure 4C:
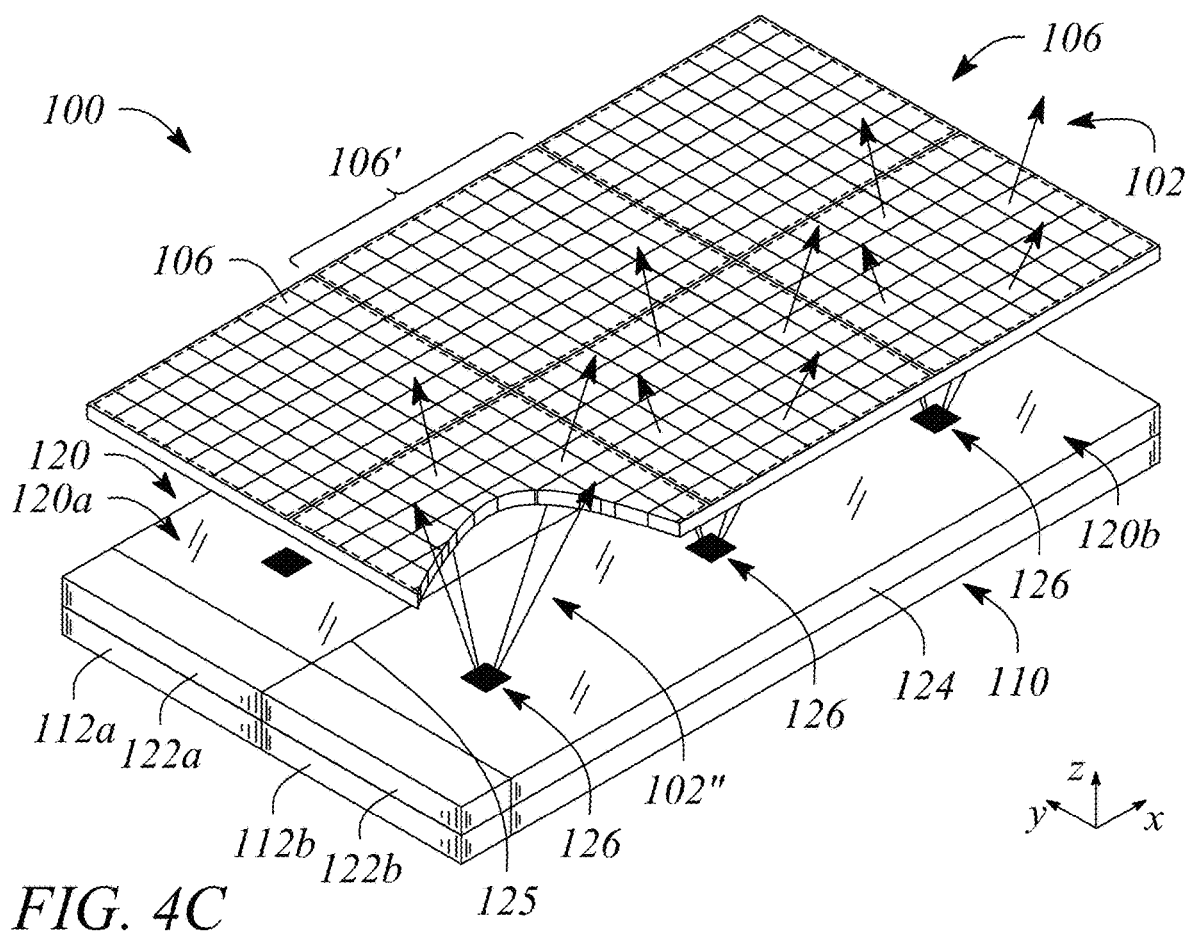
FIG. 4C illustrates a perspective view of a multi-zone backlight in an example, according to an embodiment consistent with the principles described herein.

FIG. 4A illustrates a cross-sectional view of a multi-zone backlight 100 in an example, according to an embodiment consistent with the principles described herein. FIG. 4B illustrates a cross-sectional view of a multi-zone backlight 100 in an example, according to an embodiment consistent with the principles described herein. The cross-sectional view illustrated in FIGS. 4A and 4B may represent a cross-section through on of the zones (e.g., the first 101*a*) of the multi-zone backlight 100, for example, FIG. 4C illustrates a perspective view of a multi-zone backlight 100 in an example, according to an embodiment consistent with the principles described herein. As illustrated in FIGS. 4A-4C, the multi-zone backlight 100 comprises the broad-angle backlight 110 and the multiview backlight 120. Further, emitted light 102 provided by the multi-zone backlight 100 is illustrated using arrows with broad-angle emitted light 102' being illustrated as dashed arrows and directional emitted light 102" being illustrated as a plurality of arrows representing the plurality of directional light beams of the directional emitted light 102", by way of example and not limitation.

As illustrated in FIG. 4A, the multi-zone backlight 100 is configured to provide broad-angle emitted light 102' from the first zone 101*a*. In particular, FIG. 4A illustrates the broad-angle emitted light 102' emitted from the first zone 110*a* of the broad-angle backlight 110. Further, the broad-angle emitted light 102' is depicted passing through the first zone 120*a* of the multiview backlight 120 to be emitted from the first zone 101*a* of the multi-zone backlight 100. As such, the first zone 110*a* of the broad-angle backlight 110 is activated in FIG. 4A, as illustrated by cross-hatching to illustrate activation of the separate light source 112*a* of the broad-angle backlight 110. In FIG. 4A, the first zone 120*a* of the multiview backlight 120 is inactivated or turned off, as illustrated by no cross-hatching of the separate light source 122*a* of the multiview backlight 120.

On the other hand, the multi-zone backlight 100 in FIG. 4B is configured to provide directional emitted light 102" from the first zone 101*a*, as illustrated. In particular, FIG. 4B illustrates the directional emitted light 102" emitted from a first zone 120*a* of the multiview backlight 120. As such, the first zone 120*a* of the multiview backlight 120 is activated in FIG. 4B, as illustrated by cross-hatching to illustrate activation of the separate light source 122*a* of the multiview backlight 120. In FIG. 4B, the first zone 110*a* of the broad-angle backlight 110 is inactivated or turned off, as illustrated by no cross-hatching of the separate light source 112*a* of the broad-angle backlight 110. FIG. 4C also illustrates the multi-zone backlight 100 configure to provide directional emitted light 102" from the first zone 101*a* of the multi-zone backlight 100 as well as the first zone 120*a* of the multiview backlight 120. According to some embodiments, the broad-angle backlight 110 has a planar or substantially planar light-emitting surface 110' configured to provide the broad-angle emitted light 102' from one or more of the zones, e.g., the first and second zones 110*a*, 110*b*, as illustrated. According to various embodiments, the broad-angle backlight 110 may be substantially any backlight having a plurality of independently activated zones. For example, the broad-angle backlight 110 may be a direct-emitting or directly illuminated planar backlight divided into separate zones that may be independently activated. Direct-emitting or directly illuminated planar backlights include, but are not limited to, a backlight panel employing a planar array of cold-cathode fluorescent lamps (CCFLs), neon lamps or light emitting diodes (LEDs) configured to directly illuminate the planar light-emitting surface 110' and provide the broad-angle emitted light 102'. An electroluminescent panel (ELP) is another non-limiting example of a direct-emitting planar backlight. In other examples, the broad-angle backlight 110 may comprise a backlight divided into separate zones that each employ a separate, indirect light source. Such indirectly illuminated backlights may include, but are not limited to, various forms of edge-coupled or so-called 'edge-lit' backlights.

Figure 5:
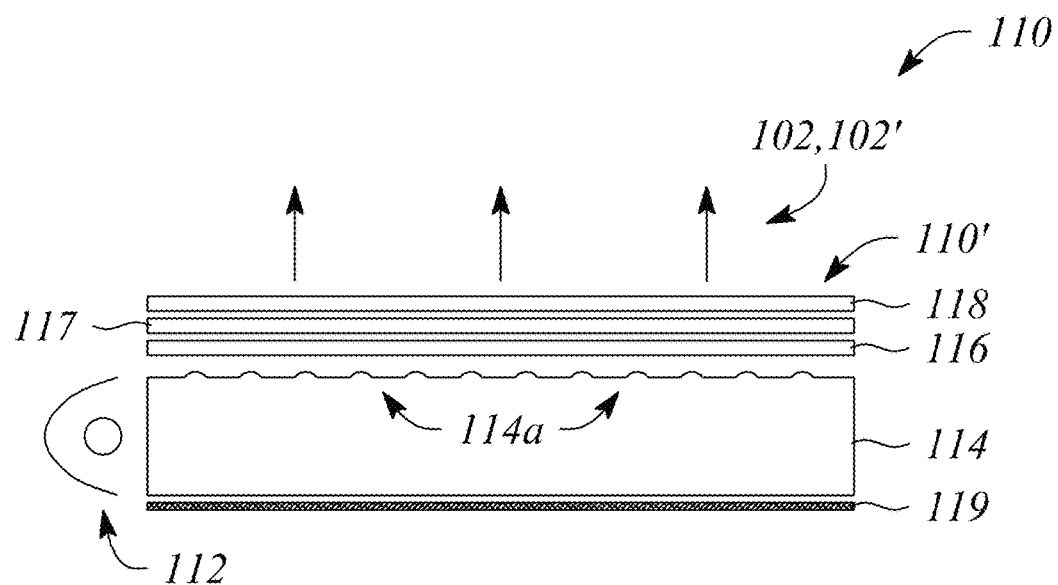
FIG. 5 illustrates a cross-sectional view of a broad-angle backlight in an example, according to an embodiment consistent with the principles described herein.

FIG. 5 illustrates a cross-sectional view of a broad-angle backlight 110 in an example, according to an embodiment consistent with the principles described herein. The cross-sectional view of FIG. 5 may represent either of the first zone 110*a* and the second zone 110*b* of the broad-angle backlight 110 illustrated in FIGS. 4A-4C, for example. As illustrated in FIG. 5, the broad-angle backlight 110 is an edge-lit backlight and comprises a light source 112 coupled to an edge of the broad-angle backlight 110. The edge-coupled light source 112 is configured to produce light within the broad-angle backlight 110 and may represent either of the separate light sources 112*a*, 112*b*. Further, as illustrated by way of example and not limitation, the broad-angle backlight 110 comprises a guiding structure 114 (or light guide) having a substantially rectangular cross section with parallel opposing surfaces (i.e., a rectangular-shaped guiding structure) along with a plurality of extraction features 114*a*. The broad-angle backlight 110 illustrated in FIG. 5 comprises extraction features 114*a* at a surface (i.e., top surface) of the guiding structure 114 of the broad-angle backlight 110, by way of example and not limitation. Light from the edge-coupled light source 112 and guided within the rectangular-shaped guiding structure 114 may be redirected, scattered out of or otherwise extracted from the guiding structure 114 by the extraction features 114*a* to provide the broad-angle emitted light 102', according to various embodiments. The broad-angle backlight 110 is activated by activating or turning on the edge-coupled light source 112.

In some embodiments, the broad-angle backlight 110, whether direct-emitting or edge-lit (e.g., as illustrated in FIG. 5), may further comprise one or more additional layers or films including, but not limited to, a diffuser or diffusion layer, a brightness enhancement film (BEF), and a polarization recycling film or layer. For example, a diffuser may be configured to increase an emission angle of the broad-angle emitted light 102' when compared to that provided by the extraction features 114*a* alone. The brightness enhancement film may be used to increase an overall brightness of the broad-angle emitted light 102', in some examples. Brightness enhancement films (BEF) are available, for example, from 3M Optical Systems Division, St. Paul, MN as a Vikuiti™ BEF II which are micro-replicated enhancement films that utilize a prismatic structure to provide up to a 60% brightness gain. The polarization recycling layer may be configured to selectively pass a first polarization while reflecting a second polarization back toward the rectangular-shaped guiding structure 114. The polarization recycling layer may comprise a reflective polarizer film or dual brightness enhancement film (DBEF), for example. Examples of DBEF films include, but are not limited to, 3M Vikuiti™ Dual Brightness Enhancement Film available from 3M Optical Systems Division, St. Paul, MN In another example, an advanced polarization conversion film (APCF) or a combination of brightness enhancement and APCF films may be employed as the polarization recycling layer.

FIG. 5 illustrates the broad-angle backlight 110 further comprising a diffuser 116 adjacent to guiding structure 114 and the planar light-emitting surface 110' of the broad-angle backlight 110. Further, illustrated in FIG. 5 are a brightness enhancement film 117 and a polarization recycling layer 118, both of which are also adjacent to the planar light-emitting surface 110'. In some embodiments, the broad-angle backlight 110 further comprises a reflective layer 119 adjacent to a surface of the guiding structure 114 opposite to the planar light-emitting surface 110' (i.e., on a back surface), e.g., as illustrated in FIG. 5. The reflective layer 119 may comprise any of a variety of reflective films including, but not limited to, a layer of reflective metal or an enhanced specular reflector (ESR) film. Examples of ESR films include, but are not limited to, a Vikuiti™ Enhanced Specular Reflector Film available from 3M Optical Systems Division, St. Paul, MN Referring again to FIGS. 4A-4C, in some embodiments (e.g., as illustrated), the multiview backlight 120 may further comprises a light guide 124. According to various embodiments, the light guide 124 is configured to guide light as guided light 104. The light guide 124 may be a plate light guide, in some embodiments. Further, the light guide 124 comprises a reflective structure 125 configured to divide the light guide 124 into a first portion and a second portion. The first portion corresponds to the first zone 120a of the multiview backlight 120 and the second portion corresponds to the second zone 120b of the multiview backlight 120.

According to various embodiments, the light guide 124 is configured to guide the guided light 104 along a length of the light guide 124 within a light guide portion (e.g., either the first portion or the second portion) according to total internal reflection. A general propagation direction 103 of the guided light 104 within the light guide 124 is illustrated by a bold arrow in FIG. 4B. In some embodiments, the guided light 104 may be guided in the propagation direction 103 at a non-zero propagation angle and may comprise collimated light that is collimated according to a predetermined collimation factor σ, as illustrated in FIG. 4B.

In various embodiments, the light guide 124 may include a dielectric material configured as an optical waveguide. The dielectric material may have a first refractive index that is greater than a second refractive index of a medium surrounding the dielectric optical waveguide. A difference in refractive indices is configured to facilitate total internal reflection of the guided light 104 according to one or more guided modes of the light guide 124, for example. In some embodiments, the light guide 124 may be a slab or plate optical waveguide comprising an extended, substantially planar sheet of optically transparent, dielectric material. According to various examples, the optically transparent material of the light guide 124 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 124 may further include a cladding layer (not illustrated) on at least a portion of a surface (e.g., one or both of the top surface and the bottom surface) of the light guide 124. The cladding layer may be used to further facilitate total internal reflection, according to some examples.

According to various embodiments, the reflective structure 125 may comprise, but is not limited to, gap in the light guide 124, a reflective wall between the portions, and a groove or similar discontinuity in a guiding surface of the light guide 124 reflectively that separates the first portion of the light guide 124 from the second portion. Some examples embodiments of the reflective structure 125 are described further below with respect to FIGS. 6A-6B, for example.

Figure 6A:
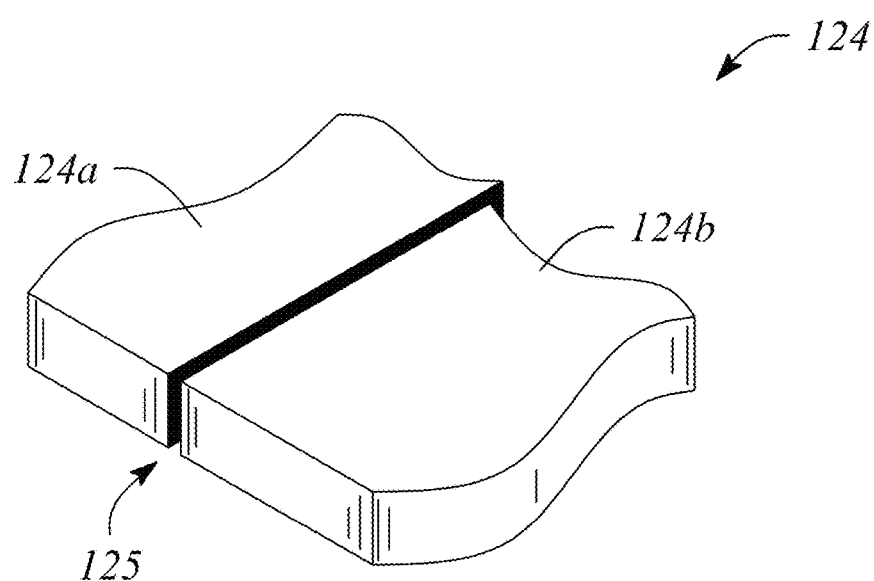
FIG. 6A illustrates a perspective view a light guide with a reflective structure in an example, according to an embodiment consistent with the principles described herein.
Figure 6B:
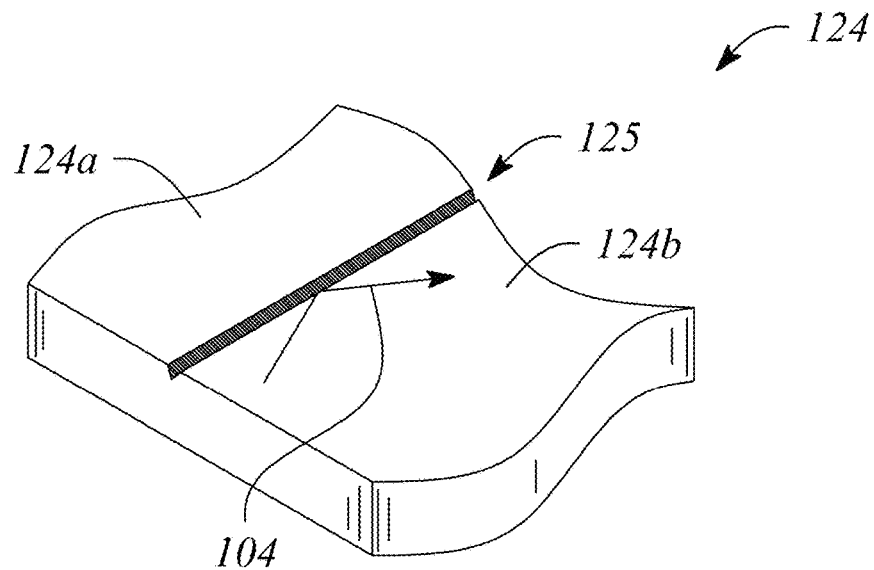
FIG. 6B illustrates a perspective view a light guide with a reflective structure in an example, according to another embodiment consistent with the principles described herein.

FIG. 6A illustrates a perspective view a light guide 124 with a reflective structure 125 in an example, according to an embodiment consistent with the principles described herein. FIG. 6B illustrates a perspective view a light guide 124 with a reflective structure 125 in an example, according to another embodiment consistent with the principles described herein. In particular, FIG. 6A illustrates the reflective structure 125 comprising a gap in the light guide 124 that separates a first portion 124a and a second portion 124b. In some embodiments, the gap may reflectively confine guided light within each of the first and second portions 124a, 124b by total internal reflection at an edge of the light guide 124 along the gap. In another embodiment, the light guide edge may be coated with a reflective material (e.g., reflective metal, reflective polymer metal, etc.) to further reflectively confine the guided light.

FIG. 6B illustrates the reflective structure 125 comprising a groove in a guiding surface of the light guide 124. As illustrated by an arrow, the groove may reflectively redirect at least some of the guided light 104 to reflectively confine the guided light 104 within one of the first and second portions 124a, 124b. While illustrated as a groove, the reflective structure 125 of FIG. 6B may be substantially any structure discontinuity in a guiding surface of the light guide 124 reflectively that separates the first portion 124a of the light guide 124 from the second portion 124b, e.g., a diffraction grating running along a length of the light guide 124.

Referring back to FIGS. 4A-4C once again, the multiview backlight 120 may further comprise an array of multibeam elements 126, e.g., as illustrated. Multibeam elements 126 of the multibeam element array are spaced apart from one another across each of the first and second portions 124a, 124b of the light guide 124, according to various embodiments. For example, in some embodiments, the multibeam elements 126 may be arranged in a one-dimensional (1D) array. In other embodiments, the multibeam elements 126 may be arranged in a two-dimensional (2D) array. Further, differing types of multibeam elements 126 may be utilized in the multiview backlight 120 including, but limited to, active emitters and various scattering elements. According to various embodiments, each multibeam element 126 of the multibeam element array is configured to provide directional light beams of the directional emitted light 102" having directions corresponding to different view directions of a multiview image during a multiview mode. In particular, directional light beams of the directional light beam plurality comprise the directional emitted light 102" provided when a zone of the multiview backlight 120 is activated, according to various embodiments.

According to various embodiments, each multibeam element 126 of the multibeam element array is configured to scatter out a portion of the guided light 104 from within the light guide 124 and to direct the scattered out portion away from a first surface 124' of the light guide 124 or equivalent from a first surface of the multiview backlight 120 to provide the directional emitted light 102", as illustrated in FIG. 4B. For example, the guided light portion may be scattered out by the multibeam element 126 through the first surface 124'. Further, as illustrated in FIGS. 4A-4C, a second surface 124" of the multiview backlight 120 opposite to the first surface may be adjacent to a light-emitting surface 110' of the broad-angle backlight 110, according to various embodiments.

Note that the plurality of directional light beams of the directional emitted light 102", as illustrated in FIG. 4B, is or represents the plurality of directional light beams having different principal angular directions, described above. That is, a directional light beam has a different principal angular direction from other directional light beams of the directional emitted light 102", according to various embodiments. Further, the multiview backlight 120 may be substantially transparent (e.g., in at least the 2D mode) to allow the broad-angle emitted light 102' from the broad-angle backlight 110 to pass or be transmitted through a thickness of the multiview backlight 120, as illustrated in FIG. 4A by the dashed arrows that originate at the broad-angle backlight 110 and subsequently pass through the multiview backlight 120. In other words, the broad-angle emitted light 102' provided by the broad-angle backlight 110 is configured to be transmitted through the multiview backlight 120, e.g., by virtue of the multiview backlight transparency.

For example, the light guide 124 and the spaced apart plurality of multibeam elements 126 may allow light to pass through the light guide 124 through both the first surface 124' and the second surface 124". Transparency may be facilitated, at least in part, due to both the relatively small size of the multibeam elements 126 and the relatively large inter-element spacing of the multibeam element 126. Further, especially when the multibeam elements 126 comprise diffraction gratings as described below, the multibeam elements 126 may also be substantially transparent to light propagating orthogonal to the light guide surfaces 124', 124", in some embodiments. Thus, for example, light from the broad-angle backlight 110 may pass in the orthogonal direction through the light guide 124 with the multibeam element array of the multiview backlight 120, according to various embodiments.

As described above, the multiview backlight 120 comprises the light sources 122 including the separate light sources 122a, 122b corresponding to each of the first and second zones 120a, 120b, respectively. As such, the multiview backlight 120 may be an edge-lit backlight, for example. According to various embodiments, the light source 122 is configured to provide the light to be guided within light guide 124 as the guided light 104. In particular, the light source 122 may be located adjacent to an entrance surface or end (input end) of the light guide 124. In various embodiments, the light source 122 may comprise substantially any source of light (e.g., optical emitter) including, but not limited to, one or more light emitting diodes (LEDs) or a laser (e.g., laser diode). In some embodiments, the light source 122 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 122 may be a substantially broadband light source configured to provide substantially broadband or polychromatic light. For example, the light source 122 may provide white light. In some embodiments, the light source 122 may comprise a plurality of different optical emitters configured to provide different colors of light. The different optical emitters may be configured to provide light having different, color-specific, non-zero propagation angles of the guided light corresponding to each of the different colors of light. As illustrated in FIG. 4B, activation of the multiview backlight 120 may comprise activating the light source 122, illustrated using cross-hatching in FIG. 4B.

In some embodiments, the light source 122 may further comprise a collimator (not illustrated). The collimator may be configured to receive substantially uncollimated light from one or more of the optical emitters of the light source 122. The collimator is further configured to convert the substantially uncollimated light into collimated light. In particular, the collimator may provide collimated light having the non-zero propagation angle and being collimated according to a predetermined collimation factors, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light to the light guide 124 to propagate as the guided light 104, described above.

As mentioned above and according to various embodiments, multiview backlight 120 comprises the array of multibeam elements 126. According to some embodiments (e.g., as illustrated in FIGS. 4A-4C), multibeam elements 126 of the multibeam element array may be located at the first surface 124' of the light guide 124 (e.g., adjacent to the first surface of the multiview backlight 120). In other embodiments (not illustrated), the multibeam elements 126 may be located within the light guide 124. In yet other embodiments (not illustrated), the multibeam elements 126 may be located at or on the second surface 124" of the light guide 124 (e.g., adjacent to the second surface of the multiview backlight 120). Further, a size of the multibeam element 126 is comparable to a size of a light valve of a multiview display configured to display the multiview image. That is, the multibeam element size is comparable to a light valve size of a light valve array in a multiview display that includes the multi-zone backlight 100 and multiview backlight 120 thereof, for example.

FIGS. 4A-4C also illustrate an array of light valves 106 (e.g., of the multiview display), by way of example and not limitation. In various embodiments, any of a variety of different types of light valves may be employed as the light valves 106 of the light valve array including, but not limited to, one or more of liquid crystal light valves, electrophoretic light valves, and light valves based on or employing electrowetting. Further, as illustrated, there may be one unique set of light valves 106 for each multibeam element 126 of the array of multibeam elements. The unique set of light valves 106 may correspond to a multiview pixel 106' of the multiview display, for example.

Herein, the 'size' may be defined in any of a variety of manners to include, but not be limited to, a length, a width or an area. For example, the size of a light valve may be a length thereof and the comparable size of the multibeam element 126 may also be a length of the multibeam element 126. In another example, size may refer to an area such that an area of the multibeam element 126 may be comparable to an area of the light valve. In some embodiments, the size of the multibeam element 126 is comparable to the light valve size such that the multibeam element size is between about twenty-five percent (25%) and about two hundred percent (200%) of the light valve size. For example, if the multibeam element size is denoted 's' and the light valve size is denoted 'S' (e.g., as illustrated in FIG. 4B), then the multibeam element size s may be given by equation (2) as:

$$\tfrac{1}{4}S \le s \le 2S \qquad (2)$$

In other examples, the multibeam element size is greater than about fifty percent (50%) of the light valve size, or about sixty percent (60%) of the light valve size, or about seventy percent (70%) of the light valve size, or greater than about eighty percent (80%) of the light valve size, or greater than about ninety percent (90%) of the light valve size, and the multibeam element is less than about one hundred eighty percent (180%) of the light valve size, or less than about one hundred sixty percent (160%) of the light valve size, or less than about one hundred forty percent (140%) of the light valve size, or less than about one hundred twenty percent (120%) of the light valve size. According to some embodiments, the comparable sizes of the multibeam element 126 and the light valve may be chosen to reduce, or in some examples to minimize, dark zones between views of the multiview display, while at the same time reducing, or in some examples minimizing, an overlap between views of the multiview display or equivalent of the multiview image.

According to various embodiments, the multibeam elements 126 of the multiview backlight 120 may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element 126 comprising a diffraction grating is configured to diffractively couple or scatter out the guided light portion as the directional emitted light 102" comprising a plurality of directional light beams having the different principal angular directions. In some embodiments, a diffraction grating of a multibeam element may comprise a plurality of individual sub-gratings. In other embodiments, the multibeam element 126 comprising a micro-reflective element is configured to reflectively couple or scatter out the guided light portion as the plurality of directional light beams, or the multibeam element 126 comprising a micro-refractive element is configured to couple or scatter out the guided light portion as the plurality of directional light beams by or using refraction (i.e., refractively scatter out the guided light portion).

Figure 7:
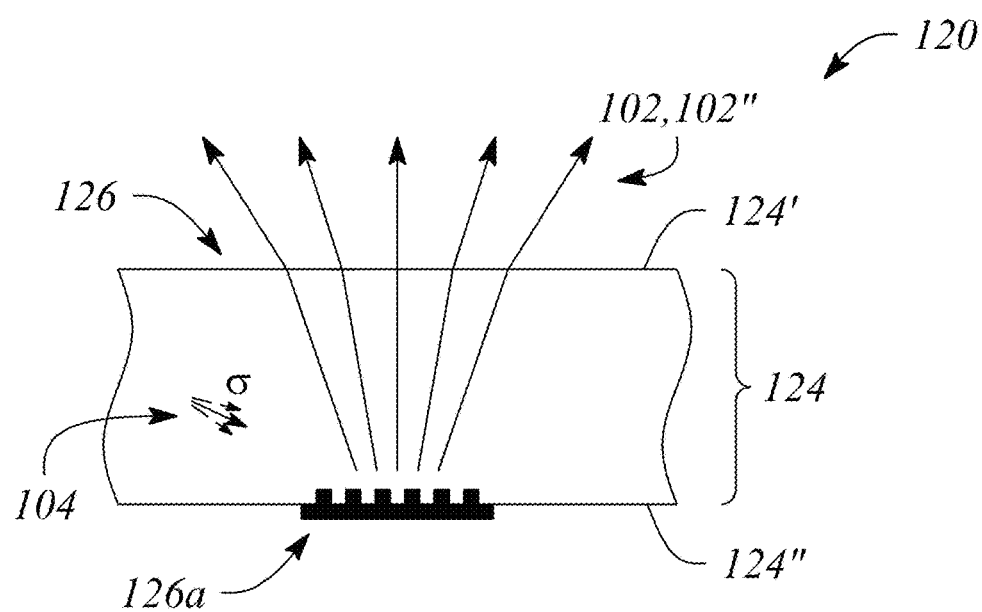
FIG. 7 illustrates a cross-sectional view of a portion of a multiview backlight including a multibeam element in an example, according to an embodiment consistent with the principles described herein.

FIG. 7 illustrates a cross-sectional view of a portion of a multiview backlight 120 including a multibeam element 126 in an example, according to an embodiment consistent with the principles described herein. In particular, FIG. 5 illustrates the multibeam element 126 of the multiview backlight 120 comprising a diffraction grating 126*a*. The diffraction grating 126*a* is configured to diffractively couple or scatter out a portion of the guided light 104 as the plurality of directional light beams of the directional emitted light 102". The diffraction grating 126*a* comprises a plurality of diffractive features spaced apart from one another by a diffractive feature spacing (or a diffractive feature pitch or grating pitch) configured to provide diffractive scattering out of the guided light portion. According to various embodiments, the spacing or grating pitch of the diffractive features in the diffraction grating 126*a* may be sub-wavelength (i.e., less than a wavelength of the guided light 104). In various embodiments, the diffraction grating 126*a* of the multibeam element 126 may be located at or adjacent to a surface of the light guide 124, while in other embodiments the diffraction grating 126*a* may be disposed between guiding surfaces of the light guide 124. For example, the diffraction grating 126*a* may be at or adjacent to the second surface 124" of the light guide 124, as illustrated in FIG. 7.

In some embodiments, the diffraction grating 126*a* of the multibeam element 126 is a uniform diffraction grating in which the diffractive feature spacing is substantially constant or unvarying throughout the diffraction grating 126*a*. In other embodiments, the diffraction grating 126*a* may be a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments (not illustrated), the diffraction grating 126*a* may comprise a plurality or an array of diffraction gratings or equivalently a plurality or an array of sub-gratings. Further, according to some embodiments, a differential density of sub-gratings within the diffraction grating 126*a* between different multibeam elements 126 of the multibeam element plurality may be configured to control a relative intensity of the plurality of directional light beams of the directional emitted light 102" that is diffractively scattered out by respective different multibeam elements 126.

Figure 8:
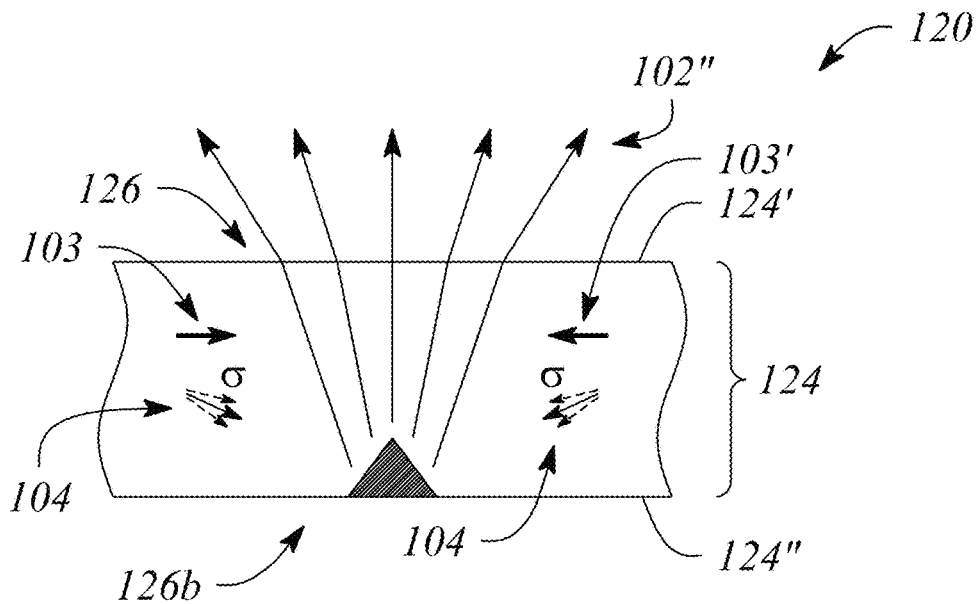
FIG. 8 illustrates a cross-sectional view of a portion of a multiview backlight including a multibeam element in an example, according to another embodiment consistent with the principles described herein.

FIG. 8 illustrates a cross-sectional view of a portion of a multiview backlight 120 including a multibeam element 126 in an example, according to another embodiment consistent with the principles described herein. In particular, FIG. 8 illustrates an embodiment of the multibeam element 126 comprising a micro-reflective element 126*b*. Micro-reflective elements used as or in the multibeam element 126 may include, but are not limited to, a reflector that employs a reflective material or layer thereof (e.g., a reflective metal) or a reflector based on total internal reflection (TIR).

Figure 9:
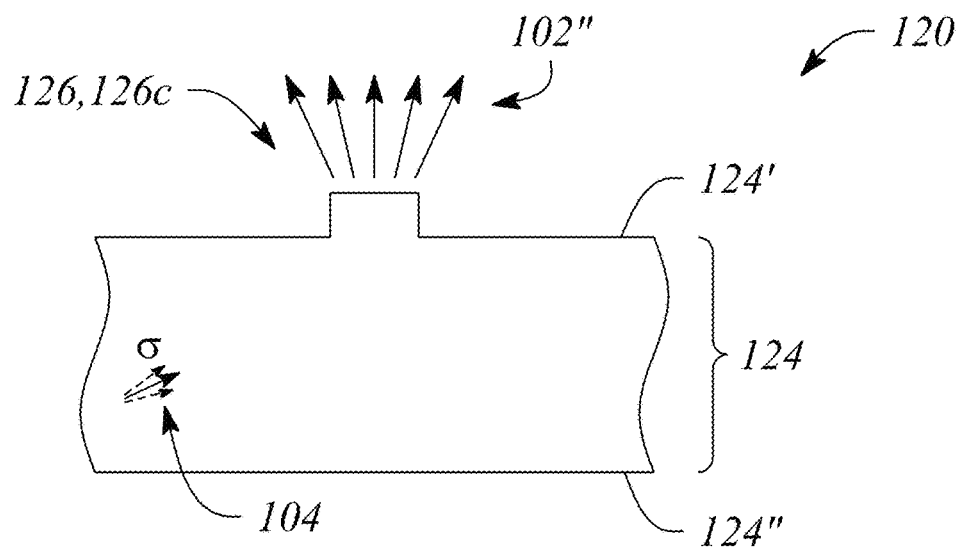
FIG. 9 illustrates a cross-sectional view of a portion of a multiview backlight including a multibeam element in an example, according to another embodiment consistent with the principles described herein.

FIG. 9 illustrates a cross-sectional view of a portion of a multiview backlight 120 including a multibeam element 126 in an example, according to another embodiment consistent with the principles described herein. In particular, FIG. 9 illustrates a multibeam element 126 comprising a micro-refractive element 126*c*. According to various embodiments, the micro-refractive element 126*c* is configured to refractively couple or scatter out a portion of the guided light 104 from the light guide 124. That is, the micro-refractive element 126*c* is configured to employ refraction (e.g., as opposed to diffraction or reflection) to couple or scatter out the guided light portion from the light guide 124 as the directional emitted light 102" comprising the directional light beams, as illustrated in FIG. 9. The micro-refractive element 126*c* may have various shapes including, but not limited to, a semi-spherical shape, a rectangular shape or a prismatic or an inverted prismatic shape (i.e., a shape having sloped facets). According to various embodiments, the micro-refractive element 126*c* may extend or protrude out of a surface (e.g., the first surface 124', as illustrated) of the light guide 124, as illustrated, or may be a cavity in the surface (not illustrated). Further, the micro-refractive element 126*c* may comprise a material of the light guide 124, in some embodiments. In other embodiments, the micro-refractive element 126*c* may comprise another material adjacent to, and in some examples, in contact with the light guide surface.

According to some embodiments of the principles described herein, a multi-zone multiview display is provided. The multi-zone multiview display comprises a plurality of zones configured to independently emit modulated light corresponding to or representing pixels of a two-dimensional (2D) image or multiview pixels of different views (view pixels) of a multiview image on a zone-by-zone basis. For example, the multiview image may be an autostereoscopic or glasses-free 3D multiview image, while the 2D image may exhibit higher resolution that is more suitable for displaying text and other 2D information that may not benefit from a third dimension (e.g., depth). Further, the multi-zone multiview display may be configured to selectively display either a two-dimensional (2D) image or a multiview image in each zone of the plurality of the different zone. Selection of an image type (i.e., a 2D image or a multiview image) in a particular zone may be determined by which of either broad-angle emitted light or directional emitted light is emitted in that zone, according to various embodiments.

Figure 10A:
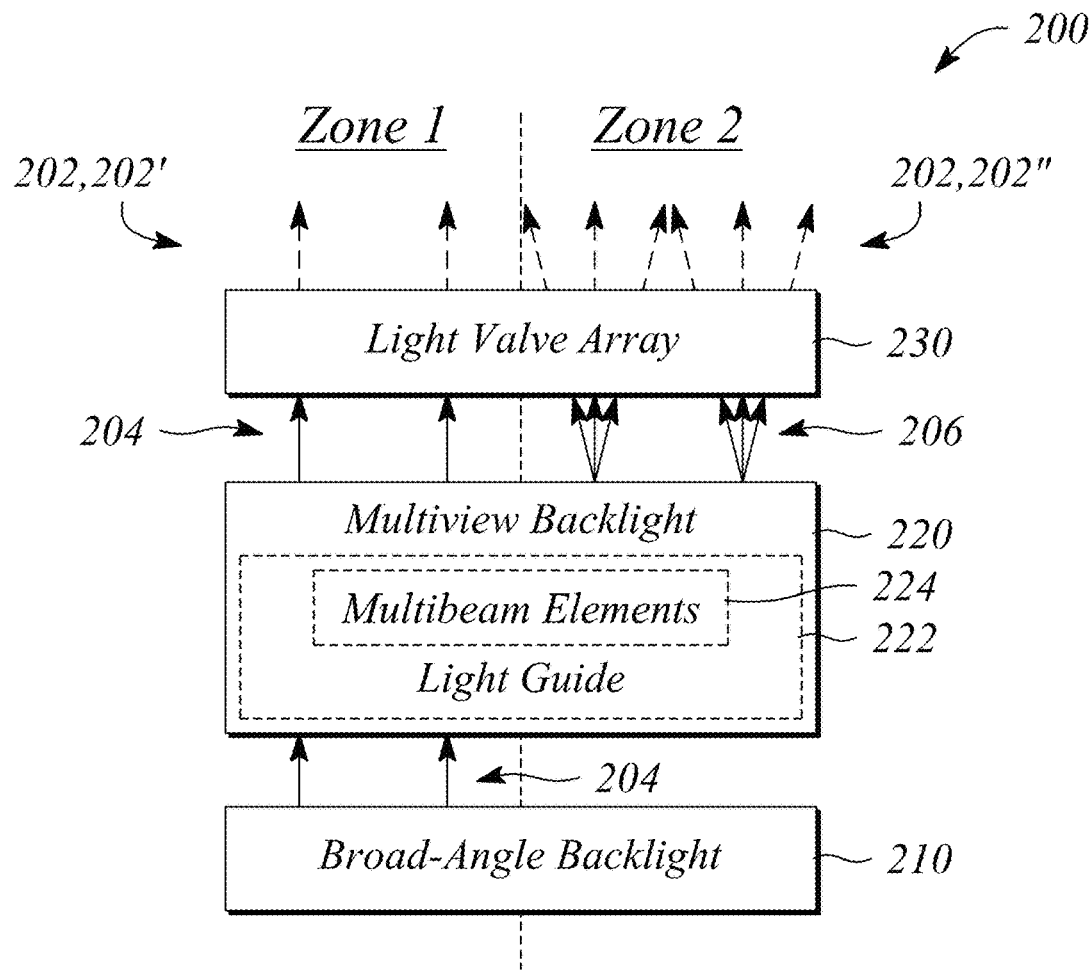
FIG. 10A illustrates a block diagram of a multi-zone multiview display in an example, according to an embodiment consistent with the principles described herein.
Figure 10B:
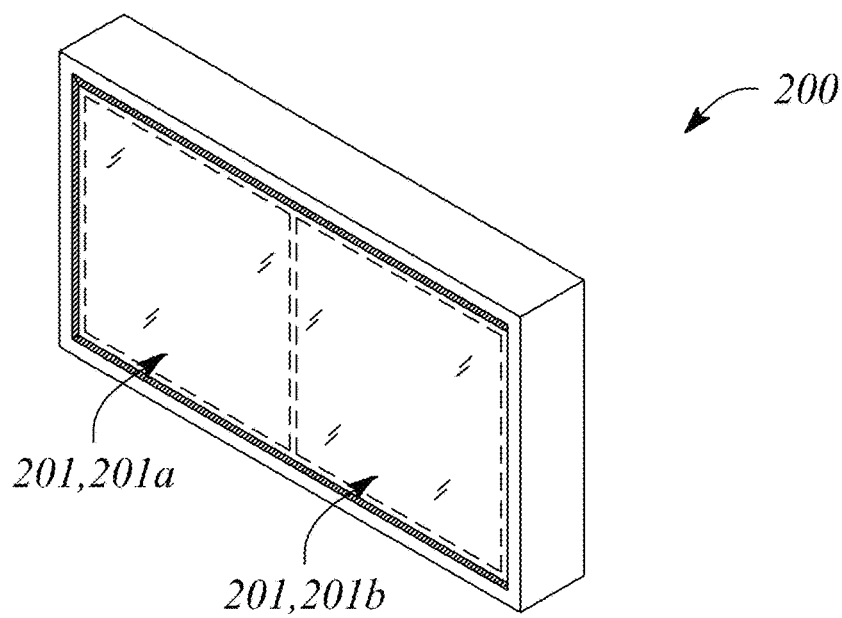
FIG. 10B illustrates a perspective view of a multi-zone multiview display in an example, according to an embodiment consistent with the principles described herein.

FIG. 10A illustrates a block diagram of a multi-zone multiview display 200 in an example, according to an embodiment consistent with the principles described herein. FIG. 10B illustrates a perspective view of a multi-zone multiview display 200 in an example, according to an embodiment consistent with the principles described herein. The multi-zone multiview display 200 illustrated in FIG. 10A-10B may be used to selectively present both 2D information and multiview information such as, but not limited to, 2D images, text, and multiview images in various different zones 201 of a plurality of zones 201 of the multi-zone multiview display 200, according to various embodiments. In particular, the multi-zone multiview display 200, as illustrated in FIG. 10A, is configured to emit modulated emitted light 202 comprising either modulated broad-angle emitted light 202' representing 2D pixels of a 2D image or comprising modulated directional emitted light 202" including directional light beams representing directional pixels of a multiview image in each of the zones 201 (e.g., a first zone 201a and a second zone 201b, as illustrated FIG. 10B). Further, modulated broad-angle emitted light 202' and modulated directional emitted light 202" may be emitted selectively in the zones 201 on a zone-by-zone basis by the multi-zone multiview display 200, according to various embodiments. FIG. 10A illustrates modulated broad-angle emitted light 202' emitted in a first zone (Zone 1) and modulated directional emitted light 202" emitted in a second zone (Zone 2), by way of example and not limitation. Modulated broad-angle emitted light 202' and modulated directional emitted light 202" is not depicted in FIG. 10B for ease of illustrated.

As illustrated, the multi-zone multiview display 200 comprises a broad-angle backlight 210. The broad-angle backlight 210 is selectively illuminate one or more zones 201 of a plurality of zones 201 of the multi-zone multiview display 200 with broad-angle emitted light 204. In some embodiments, the broad-angle backlight 210 may be substantially similar to the broad-angle backlight 110 of the multi-zone backlight 100, described above. For example, the broad-angle emitted light 204 may be emitted to illuminate one or both of the first and second zones 201a, 201b of the multi-zone multiview display 200.

The multi-zone multiview display 200 illustrated in FIGS. 10A and 10B further comprises a multiview backlight 220. The multiview backlight 220 is configured to selectively illuminate one or more zones of the zone plurality with directional emitted light comprising directional light beams having directions corresponding to different view directions of a multiview image. In some embodiments, the multiview backlight 220 may be substantially similar to the multiview backlight 120 of the above-described multi-zone backlight 100. For example, the directional emitted light 206 may be emitted to illuminate one or both of the first and second zones 201a, 201b of the multi-zone multiview display 200. Moreover, broad-angle backlight 210 and the multiview backlight 220 of the multi-zone multiview display 200 may be configured to cooperatively illuminate each of the zones 201 (e.g., the first and second zones 201a, 201b) with only one of either the broad-angle emitted light 204 and the directional emitted light 206, according to some embodiments.

In some embodiments, a number of zones in the zone plurality of the broad-angle backlight 210 may differ from a number of zones in the zone plurality the multiview backlight 220. For example, the broad-angle backlight 210 may have more zones than the multiview backlight 220. In some embodiments, a broad-angle backlight zone and a multiview backlight zone may be configured to concurrently illuminate a zone 201 of the multi-zone multiview display 200 with both broad-angle emitted light 204 and directional emitted light 206, for example.

In some embodiments, as illustrated by way of example in FIG. 10A, the multiview backlight 220 comprises a light guide 222 and an array of multibeam elements 224 spaced apart from one another. The array of multibeam elements 224 is configured to scatter out guided light from the light guide 222 as directional emitted light 206. According to various embodiments, the directional emitted light 206 provided by an individual multibeam element 224 of the multibeam element array comprises a plurality of directional light beams having different principal angular directions corresponding to view directions of the multiview image displayed by the multi-zone multiview display 200 when displaying a multiview image in a selected zone 201 of the multi-zone multiview display 200. In some embodiments, the light guide 222 and multibeam elements 224 may be substantially similar to the above-described the light guide 124 and multibeam elements 126, respectively. In particular, the light guide 222 may be configured to guide light as guided light and further may be divided by a reflective structure into a plurality of portions corresponding to and aligned with the plurality of zones 201 of the multi-zone multiview display 200. Further, a multibeam element 224 of the array of multibeam elements 224 may comprises one or more of a diffraction grating, a micro-reflective element and a micro-refractive element optically connected to the light guide 222 to scatter out the guided light as the directional emitted light 206, according to various embodiments.

As illustrated, the multi-zone multiview display 200 further comprises a light valve array 230. The light valve array 230 is configured to modulate the broad-angle emitted light 204 to provide a two-dimensional (2D) image. Further, the light valve array 230 is configured to modulate the directional emitted light 206 to provide a multiview image. In particular, the light valve array 230 is configured to receive and modulate the broad-angle emitted light 204 to provide the modulated broad-angle emitted light 202'. Similarly, the light valve array 230 is configured to receive and modulate the directional emitted light 206 to provide the modulated directional emitted light 202". In some embodiments, the light valve array 230 may be substantially similar to the array of light valves 106, described above with respect to the multi-zone backlight 100. For example, a light valve of the light valve array may comprise a liquid crystal light valve. Further, a size of a multibeam element 224 of the array of multibeam elements 224 may be comparable to a size of a light valve of the light valve array 230 (e.g., between one quarter and two times the light valve size), in some embodiments. According to various embodiments, the 2D image is provided in a zone 201 selectively illuminated by the broad-angle emitted light 204 and the multiview image is provided in a zone 201 selectively illuminated by the directional emitted light 206.

According to some embodiments (not illustrated), the multi-zone multiview display 200 further comprises a plurality of light sources. The plurality of light sources is configured to provide light to be guided as the guided light within a light guide of either the broad-angle backlight 210 or the multiview backlight 220, according to some embodiments. Each light source of the light source plurality may be optically connected to provide light to a different portion of the plurality of portions of the light guide 222 of the multiview backlight 220 or equivalently to different portions of a light guide of the broad-angle backlight 210, for example. In some embodiments, light sources of the light source plurality of the multi-zone multiview display may be substantially similar to the separate light sources 112a, 112b, 122a, 122b described above with respect to the multi-zone backlight 100.

Figure 11:
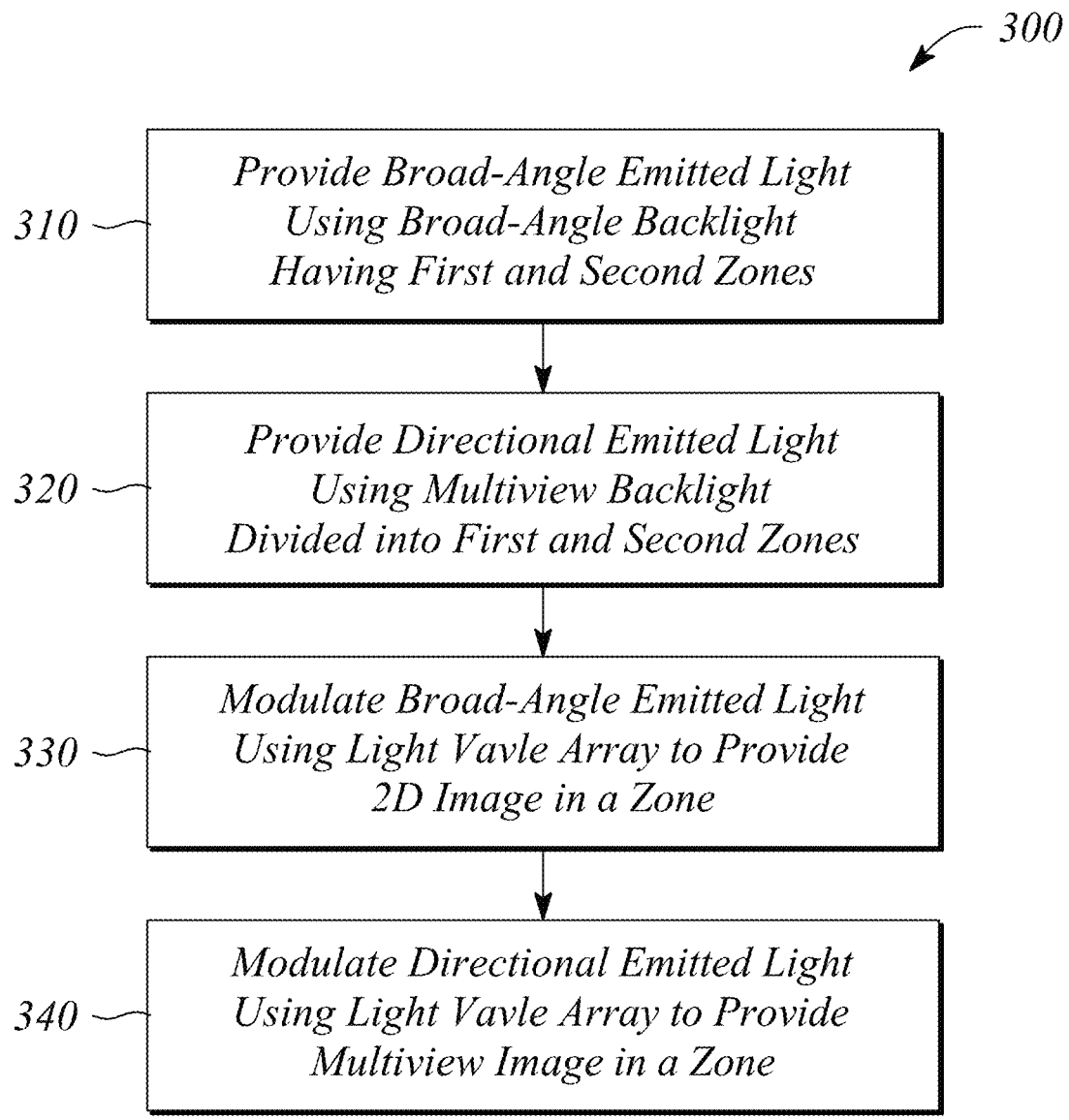
FIG. 11 illustrates a flow chart of a method of multi-zone backlight operation in an example, according to an embodiment consistent with the principles described herein.

In accordance with other embodiments of the principles described herein, a method of multi-zone backlight operation is provided. FIG. 11 illustrates a flow chart of a method 300 of multi-zone backlight operation in an example, according to an embodiment consistent with the principles described herein. As illustrated in FIG. 11, the method of multi-zone backlight operation comprises providing 310 broad-angle emitted light using a broad-angle backlight having a first zone and a second zone. According to various embodiments, each of the first and second zones independently provides broad-angle emitted light when activated. In some embodiments, the broad-angle backlight may be substantially similar to the broad-angle backlight 110 of the multi-zone backlight 100, described above.

The method 300 of multi-zone backlight operation further comprises providing 320 directional emitted light using a multiview backlight divided into a first zone and a second zone. Each of the first and second zones independently provide the directional emitted light comprising a plurality of directional light beams having directions corresponding to different view directions of a multiview image when activated. According to some embodiments, the directional emitted light comprises a plurality of directional light beams that may be provided by each multibeam element of a multibeam element array, for example. In particular, directions of directional light beams of the directional light beam plurality correspond to different view directions of a multiview image, according to various embodiments. In some embodiments, the multiview backlight may be substantially similar to the multiview backlight 120 of the above-described multi-zone backlight 100. For example, the first and second zones of the multiview backlight may correspond to and also be aligned with respective ones of the first and second zones of the broad-angle backlight.

In some embodiments (not illustrated), providing 320 the plurality of directional light beams comprises guiding light in a light guide as guided light and scattering out a portion of the guided light using multibeam elements of the multibeam element array. Further, each multibeam element of the multibeam element array may comprise one or more of a diffraction grating, a micro-refractive element, and a micro-reflective element, in some embodiments. In some embodiments, the multiview elements of the multibeam element array may be substantially similar to the multibeam elements 126 of the above-described multiview backlight 120. Further, the light guide may be substantially similar to the light guide 124, as described above. The method 300 of multi-zone backlight operation may further comprise providing light to the light guide, the guided light within the light guide being collimated according to a predetermined collimation factor as described above, in some embodiments.

According to some embodiments (e.g., as illustrated in FIG. 11, the method 300 of multi-zone backlight operation may further comprise modulating 330 the broad-angle emitted light using an array of light valves to provide a 2D image in a zone of the multi-zone backlight, and modulating 340 the plurality of directional light beams of the directional emitted light using the light valve array to provide a multiview image in one or more zones of the multi-zone backlight. In some other embodiments, a size of a multibeam element of the multibeam element array may be configured as between one quarter and two times a size of a light valve of the light valve array. In some embodiments, the array of light valves may be substantially similar to the array of light valves 106, described above with respect to the multi-zone backlight 100.

Thus, there have been described examples and embodiments of a multi-zone backlight, a multi-zone multiview display, and a method of multi-zone backlight operation that provide and employ multiple zones of illumination. It should be understood that the above-described examples are merely illustrative of some of the many specific examples and embodiments that represent the principles described herein. Clearly, those skilled in the art can readily devise numerous other arrangements without departing from the scope as defined by the following claims.

What is claimed is:

1. A multi-zone backlight comprising:
a broad-angle backlight having a first zone and a second zone, each of the first and second zones of the broad-angle backlight being configured to independently provide broad-angle emitted light when activated; and
a multiview backlight divided into a first zone and a second zone, each of the first and second zones of the multiview backlight being configured to independently provide directional emitted light comprising directional light beams having directions corresponding to different view directions of a multiview image when activated,
the multiview backlight being adjacent to the broad-angle backlight and transparent to the broad-angle emitted light, the first and second zones of the multiview backlight corresponding to and being aligned with respective ones of the first and second zones of the broad-angle backlight,
the multiview backlight including a light guide configured to guide light as guided light,
the light guide being divided by a reflective structure into a first portion corresponding to the first zone of the multiview backlight and a second portion corresponding to the second zone of the multiview backlight.

2. The multi-zone backlight of claim 1, wherein the first zones of each of the broad-angle backlight and the multiview backlight are configured to be cooperatively activated to provide either the broad-angle emitted light or the directional emitted light, and wherein the second zones of the broad-angle backlight and the multiview backlight are configured to be activated to cooperatively provide either the broad-angle emitted light or the directional emitted light.

3. The multi-zone backlight of claim 1, wherein the first and second zones of the broad-angle backlight and the multiview backlight each comprise a separate light source, individual activation of the separate light sources being configured to activate respective ones of the first and second zones.

4. The multi-zone backlight of claim 1, wherein the multiview backlight
further includes an array of multibeam elements spaced apart from one another across each of the first and second portions of the light guide, each multibeam element of the multibeam element array being configured to scatter out a portion of the guided light from the light guide as the directional light beams of the directional emitted light.

5. The multi-zone backlight of claim 1, wherein the reflective structure comprises a reflective wall that separates the first portion of the light guide from the second portion of the light guide.

6. The multi-zone backlight of claim 1, wherein the reflective structure comprises a groove in a guiding surface of the light guide, the groove being parallel to a light propagation direction and the light guide being continuous across the first and second portions.

7. The multi-zone backlight of claim 1, wherein the first and second portions of the light guide are each configured to guide the guided light according to a predetermined collimation factor as collimated guided light.

8. The multi-zone backlight of claim 1, wherein multibeam elements of the multibeam element array comprise one or more of a diffraction grating configured to diffractively scatter out the guided light, a micro-reflective element configured to reflectively scatter out the guided light, and a micro-refractive element configured to refractively scatter out the guided light.

9. The multi-zone backlight of claim 8, wherein a diffraction grating of a multibeam element comprises a plurality of individual sub-gratings.

10. A multi-zone multiview display comprising the multi-zone backlight of claim 1, the multi-zone multiview display further comprising an array of light valves configured to modulate the broad-angle emitted light to provide a 2D image and to modulate the directional emitted light to provide the multiview image.

11. The multi-zone multiview display of claim 10, wherein the multiview backlight comprises an array of multibeam elements, a size of each multibeam element of the multibeam element array being between one quarter and two times a size of a light valve of the light valve array.

12. A multi-zone multiview display comprising:
a broad-angle backlight configured to selectively illuminate one or more zones of a plurality of zones of the multi-zone multiview display with broad-angle emitted light;
a multiview backlight configured to selectively illuminate one or more zones of the zone plurality with directional emitted light comprising directional light beams having directions corresponding to different view directions of a multiview image, the multiview backlight including a light guide configured to guide light as guided light, the light guide being divided by a reflective structure into respective portions corresponding to the zone of the plurality of zones; and
an array of light valves configured to modulate the broad-angle emitted light to provide a 2D image and to modulate the directional emitted light to provide the multiview image,
the 2D image being provided in a zone selectively illuminated by the broad-angle emitted light and the multiview image is provided in a zone selectively illuminated by the directional emitted light.

13. The multi-zone multiview display of claim 12, wherein the multi-zone multiview display is configured to exclusively provide only one of the 2D image and the multiview image to each zones of the plurality of zones of the multi-zone multiview display.

14. The multi-zone multiview display of claim 12, wherein the broad-angle backlight has a plurality of zones corresponding to the plurality of zones of the multi-zone multiview display, each zone of the plurality of zones of the broad-angle backlight being configured to be separately activated to selectively illuminate zones of the plurality of zones of the multi-zone multiview display with the broad-angle emitted light.

15. The multi-zone multiview display of claim 12, wherein the multiview backlight comprises:
a light guide configured to guide light as guided light, the light guide being divided by a reflective structure into a plurality of portions corresponding to the plurality of zones of the multi-zone multiview display;
an array of multibeam elements are spaced apart from one another across the plurality of portions of the light guide, each multibeam element of the multibeam element array being configured to scatter out a portion of the guided light from the light guide as the directional light beams of the directional emitted light; and
a plurality of light sources configured to provide light to be guided as the guided light within the light guide, each light source of the light source plurality being optically connected to the light guide to provide light to a different portion of the plurality of portions, wherein light sources of the plurality of light sources are configured to be separately activated to selectively illuminate zones of the plurality of zones of the multi-zone multiview display with the directional emitted light.

16. The multi-zone multiview display of claim 15, wherein the reflective structure comprises one or both of a reflective wall that separates portions of the plurality of portions from one another and a groove in a guiding surface of the light guide, the groove being parallel to a light propagation direction and the light guide being continuous across the plurality of portions.

17. The multi-zone multiview display of claim 15, wherein the light guide is configured to guide the guided light according to a collimation factor as collimated guided light, and wherein a size of each multibeam element of the multibeam element array is between one quarter and two times a size of a light valve of the light valve array.

18. The multi-zone multiview display of claim 15, wherein each multibeam element of the multibeam element array comprises one or more of a diffraction grating configured to diffractively scatter out the guided light, a micro-reflective element
configured to reflectively scatter out the guided light, and a micro-refractive element configured to refractively scatter out the guided light.

19. A method of operating a multi-zone backlight, the method comprising:
providing broad-angle emitted light using a broad-angle backlight having a first zone and a second zone, each of the first and second zones of the broad-angle backlight independently providing the broad-angle emitted light when activated;
providing directional emitted light using a multiview backlight divided into a first zone and a second zone, each of the first and second zones of the multiview backlight independently providing the directional emitted light comprising a plurality of directional light beams having directions corresponding to different view directions of a multiview image when activated, the first and second zones of the multiview backlight corresponding to and being aligned with respective ones of the first and second zones of the broad-angle backlight; and extracting guided light from a light guide of the multiview backlight to form the directional emitted light, the light guide being divided by a reflective structure into a first portion corresponding to the first zone of the multiview backlight and a second portion corresponding to the second zone of the multiview backlight.

20. The method of operating a multi-zone backlight of claim 19, wherein providing the directional emitted light comprises:

guiding light in a light guide as guided light; and scattering out a portion of the guided light using multibeam elements of a multibeam element array as the directional emitted light, each multibeam element of the multibeam element array comprising one or more of a diffraction grating, a micro-refractive element, and a micro-reflective element.

21. The method of operating a multi-zone backlight of claim 19, further comprising:

modulating the broad-angle emitted light using an array of light valves to provide a 2D image in a zone of the multi-zone backlight; and modulating the plurality of directional light beams of the directional emitted light using the light valve array to provide a multiview image in another zone of the multi-zone backlight.

* * * * *